July 5, 1966   J. W. DAVIS ETAL   3,258,909
DIRECT HEATING CONTACT IONIZATION PROPULSION SYSTEM
Filed May 11, 1962   3 Sheets-Sheet 1
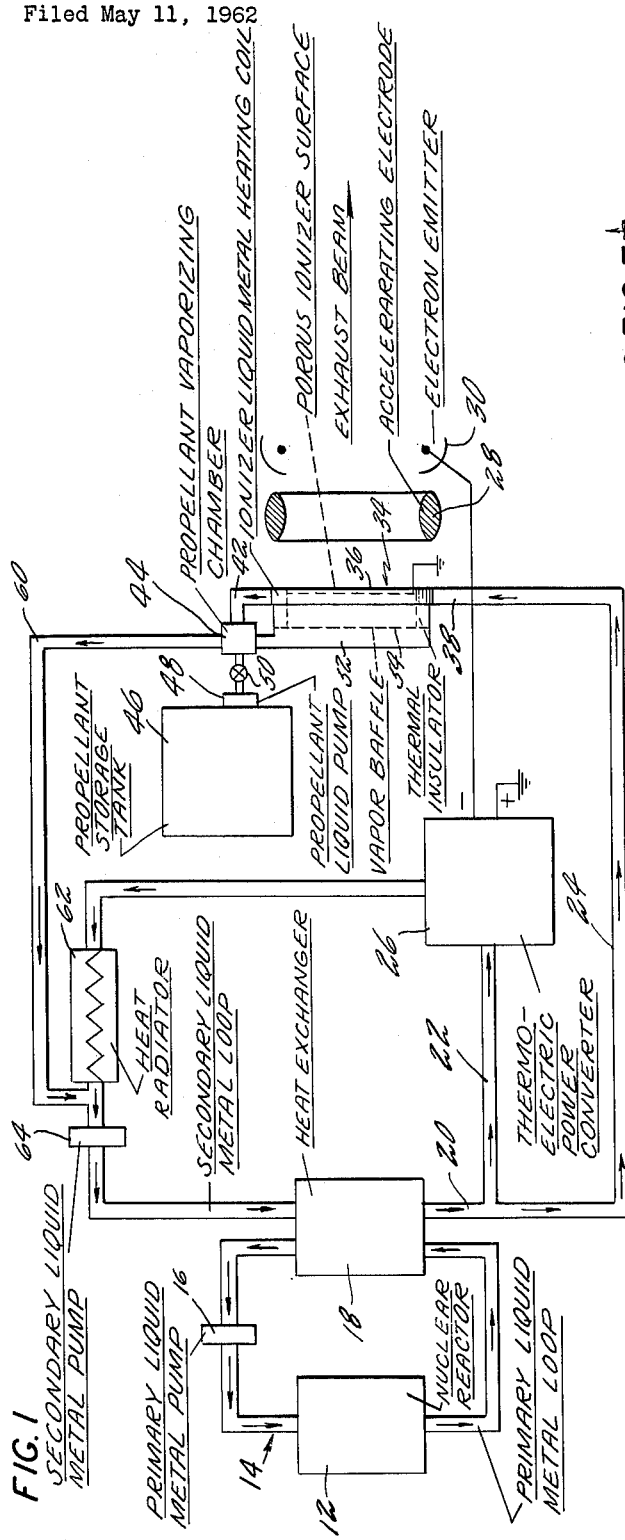
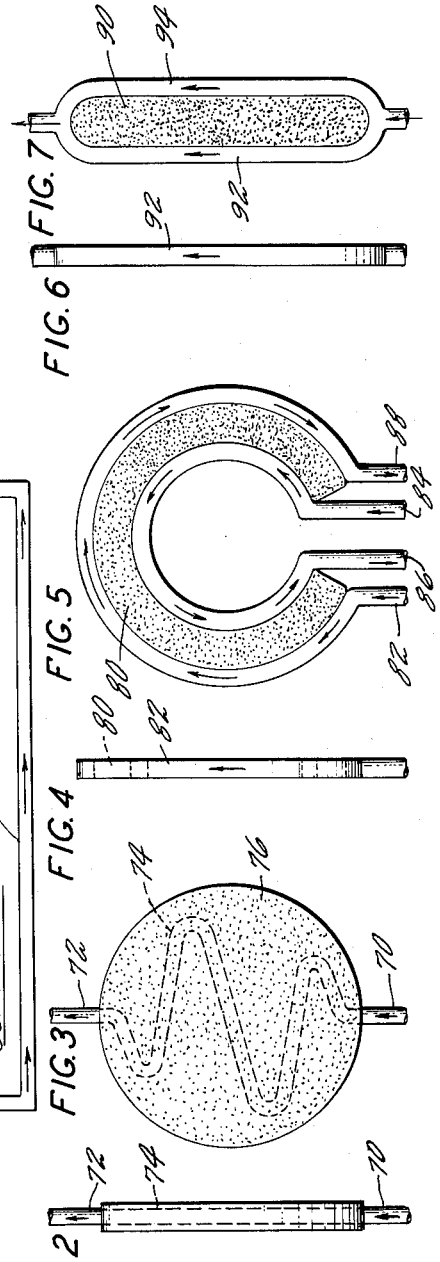
INVENTORS
JACK W. DAVIS
WILLIAM O. GAFFIN
BY
ATTORNEY July 5, 1966  J. W. DAVIS ETAL  3,258,909
DIRECT HEATING CONTACT IONIZATION PROPULSION SYSTEM
Filed May 11, 1962  3 Sheets-Sheet 2

INVENTORS
JACK W. DAVIS
WILLIAM O. GAFFIN
BY Leonard F. Wekelind
ATTORNEY

United States Patent Office 3,258,909
Patented July 5, 1966

---

3,258,909
DIRECT HEATING CONTACT IONIZATION PROPULSION SYSTEM
Jack W. Davis, East Hartford, and William O. Gaffin, West Hartford, Conn., assignors to United Aircraft Corporation, East Hartford, Conn., a corporation of Delaware
Filed May 11, 1962, Ser. No. 194,090
6 Claims. (Cl. 60—35.5)

This invention relates to ion propulsion systems and more particularly to ion propulsion systems in which the ionizer means is substantially in a direct heat exchange relationship with the heat source or heat system.

In electrostatic ion propulsion systems efficient contact ionization, of for example a cesium propellant on an ionizing surface of tungsten, requires surface temperatures on the order of 2100–2200° F. Due to this high temperature requirement it has been the practice to heat the ionizer surfaces with electrical resistance elements. While this method of heating may be satisfactory for engines operating at high specific impulse ($I_{sp} > 6000$ sec.) it results in significant penalties in engines operating at low specific impulse. In the systems known to date, it has been the practice to utilize heat from a heat source and then to convert the heat energy through a generator into electrical power. The electrical power in turn was utilized to heat the ionizing surfaces. Such systems have several drawbacks. For example, the electrical power which is converted to heat at the ionization electrode is on the order of 20% or less of the initial thermal output of the primary energy source. At low specific impulse the energy from the primary energy source may be divided, for example, 50% to the ionization electrode and 50% for the accelerating electrode. With efficiencies of about 15% for the conversion of heat to electricity the ionizer consumes considerable power when electrical heating is used. By direct heating (without conversion to electricity and back to heat) the output of the device can either be boosted or preferably a smaller system can be made to perform the same mission. In addition, the energy conversion equipment required to supply the ionizer constitutes a significant portion of the total power-plant weight of low specific impulse systems. Since only heat energy is required by the ionizer, this energy may be supplied directly if the heat source temperature is higher than the temperature required in the ionizer.

It is therefore an object of this invention to avoid the conversion of energy from heat into electrical energy and then back again by way of resistors to heat in the ionizer. Efficiency losses in each conversion is thus avoided.

It is a further object of this invention to provide a liquid metal heat transfer loop which is capable of relatively high temperature operation to transfer thermal energy from the primary heat source to the ionizer of an electrical propulsion ionizer system.

It is a still further object of this invention to provide ionizer means which may operate by direct conductive heating or by radiant heat transfer.

As used herein the term "direct heating" refers to the heating of the ionizer by conducting heat from the heat source to the ionizer region without having an intermediate conversion into electrical power.

These and other objects of this invention will become readily apparent from the following detailed description of the drawings in which:

FIG. 1 is a schematic illustration of an ion propulsion system and heat cycle according to this invention;

FIGS. 2 through 7 are schematic illustrations of arrangements for the flow of the liquid metal through the ionizer means;

Figure 8:
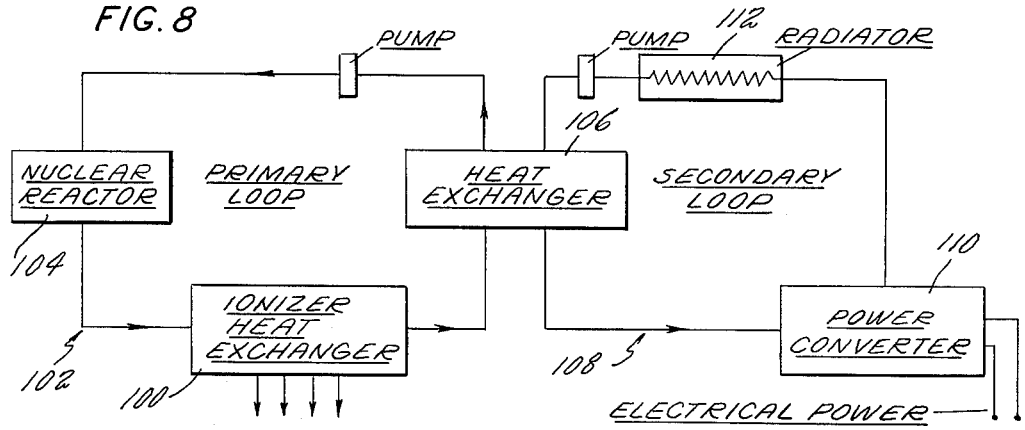
FIG. 8 is a schematic illustration of a modified ion propulsion system.

Analysis shows that the electrical efficiency of a cesium ion engine utilizing a directly heated ionizer approaches 100% for the range of specific impulse from 2000 to 8000 seconds. At specific impulse of 2,000 seconds the electrical efficiency is increased from 28% with electrical heating to nearly 90% with direct heating. It should be noted that although this change in electrical efficiency involves no change in total power supplied to the engine it reduces electrical power requirement and leads to a substantial reduction in reactor output and radiator size in a nuclear turbo-electric or other appropriate conversion system. Comparative studies bearing out the increased efficiency and reduced weight of direct heated ionization services is described in Report No. AD–110020–1 entitled "Anlysis of Direct Thermal Heating of Ionizer Surfaces in Cesium Ion Engines," written by Conrad N. Banas and issued by the Research Laboratories of United Aircraft Corporation, East Hartford, Connecticut, on March 13, 1962.

Referring to FIG. 1, a nuclear reactor or other suitable heat source is schematically illustrated at 12. The heat from the nuclear reactor is extracted by a liquid metal loop 14 in which the liquid metal is circulated by means of a suitable pump 16. The primary loop 14 circulates through a heat exchanger 18 by means of which heat is transferred to the secondary liquid metal loop 20. The temperatures of the liquid metal loops must be in the order of 2300° F. in order to supply adequate ionizer heating, i.e., a sufficiently high temperature level at the ionizer to insure ionization. The loop 20 includes parallel paths 22 and 24. The path 22 passes a relatively large portion of the heat in the secondary loop to a thermoelectric power converter 26 which provides the electrical power necessary for properly operating the accelerating electrode 28 and the electron emitter 30.

A relatively small portion of the heat is utilized in the liquid metal path 24 leading to the ionizing means generally indicated at 34. The ionizing means includes a porous ionizer surface 36 which is heated directly by the liquid metal flowing from the line 24 to the inlet line 38 leading to the ionizer means 34. The liquid metal heats the ionizer surface to a temperature in the order of 2100° F. in order to provide efficient contact ionization. The liquid metal flows through the exit line 42 and then to a preheated or propellant vaporization chamber 44. The propellant which may be cesium is stored in a tank 46 and is circulated by a pump 48 by a valve 50 into the vaporization chamber 44. The vaporized cesium then flows to an aft chamber 52 in the ionizing means 34 through a vapor baffle 54 after which it contacts the porous ionizing surface 36. Upon contact with the heated surface 36 the vaporized cesium is ionized in passing through the surface 36 after which it is exhausted in a downstream direction. The accelerator and electron emitter operate in the usual manner as is well known in the art.

The liquid metal which leaves the vaporizing chamber 44 flows through a line 60 and then to the downstream end of the heat sink or radiator 62 and finally to a circulating pump 64. The radiator 62 receives flow from the power converter 26.

FIGS. 2 and 3 illustrate one form of ionization surface. As shown herein, fluid inlet and outlet lines 70 and 72 are provided with an intermediate zig-zag or coil 74 which is in direct heat exchange relation with the ionizing surface 76. The ionizing surface 76 may be of porous tungsten or other suitable material capable of withstanding the relatively high temperatures. The gaseous cesium upon contact with the surface will be heated and ionized and the accelerator of FIG. 1 will then propel the ions in an aft direction.

FIGS. 4 and 5 illustrate another form of contact ionizer arrangement wherein the porous ionizing surface 80 is an annular form and includes inlet lines 82, 84 and outlet lines 86, 88 arranged to provide a counterflow.

FIGS. 6 and 7 illustrate a contact ionizing surface 90 which includes a surrounding bifurcated flow path comprising two legs 92 and 94. The arrangement shown in FIGS. 6 and 7 may be of the type suitable for a schematic arrangement such as that shown in FIG. 1.

It will be noted that the ionizer heat exchanger of FIG. 1 is located in the secondary loop. As shown in FIG. 8, the ionizer heat exchanger 100 is located in the primary loop 102. In this instance the ionizer heat exchanger will benefit from the heat in the primary loop while avoiding the temperature drop which necessarily ensues from losses encountered in passing from the primary to the secondary loop as would be the case of the system shown in FIG. 1.

As seen in FIG. 8, the heat derived from the nuclear reactor 104 flows directly to the ionizer 100 and then to the heat exchanger 106. The heat exchanger 106 transmits heat to the liquid metal secondary loop 108 which provides the energy for the power converter 110 to provide the necessary electrical power for acceleration. As in the instance of FIG. 1, a suitable radiator or heat sink 112 is also provided.

Figure 9:
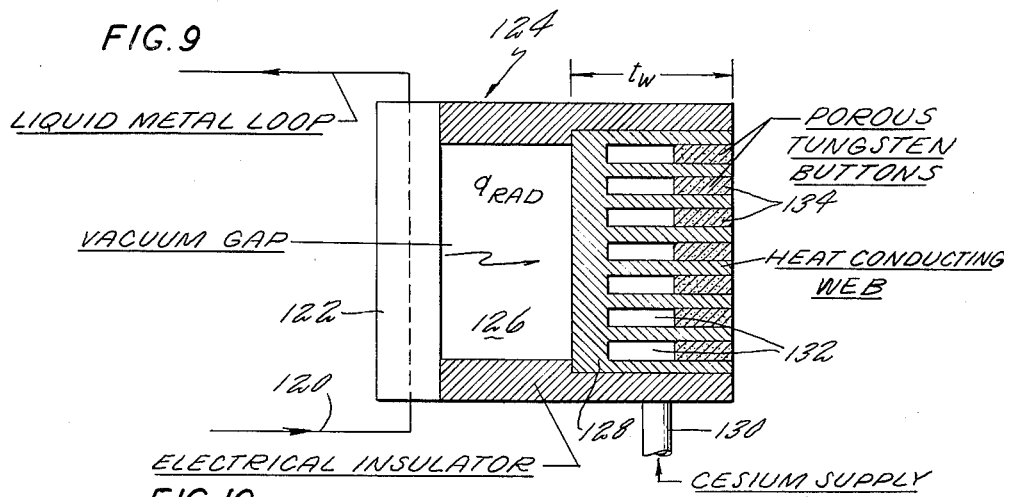
FIG. 9 is an enlarged schematic illustration of an ionizing means utilizing a radiant heat transfer.
Figure 10:
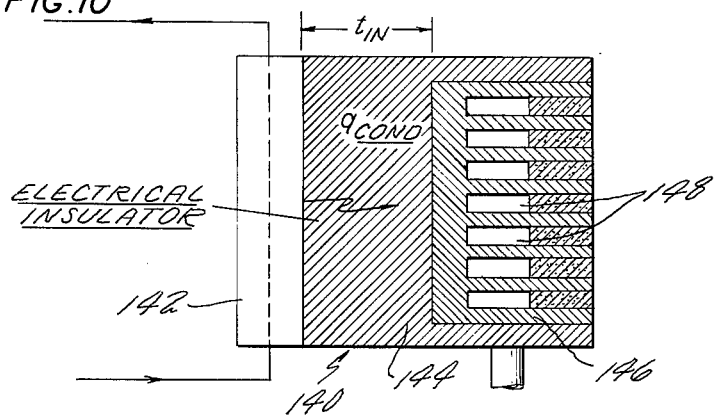
FIG. 10 is an enlarged schematic illustration of an ionizing means utilizing a conductive heat exchange relation.

FIGS. 9 and 10 show two possible forms of ionizer heat exchangers. As seen in FIG. 9, liquid metal loop 120 passes through the aft end 122 of the ionizer 124. A vacuum in the chamber 126 provides a path for radiation of heat from the region 122 to the conduction member 128. The conduction member in turn heats the cesium which is fed through the inlet 130 and flows through the interstices 132. Porous tungsten sections 134 provide the ionization contact surfaces necessary to ionize the cesium.

FIG. 10 shows a modified ionizer 140 through which liquid metal is passed in the aft region 142. Conductor portion 144 conducts the heat directly to the grid or web structure 146 to in turn heat the cesium flow in the interstices 148. It may be necessary to electrically isolate the ionizer from the liquid metal loop. Hence the portion 144 may be of a material which has the quality of high thermal conductivity but relatively low electrical conductivity. Ionization then takes place as previously described.

Figure 11:
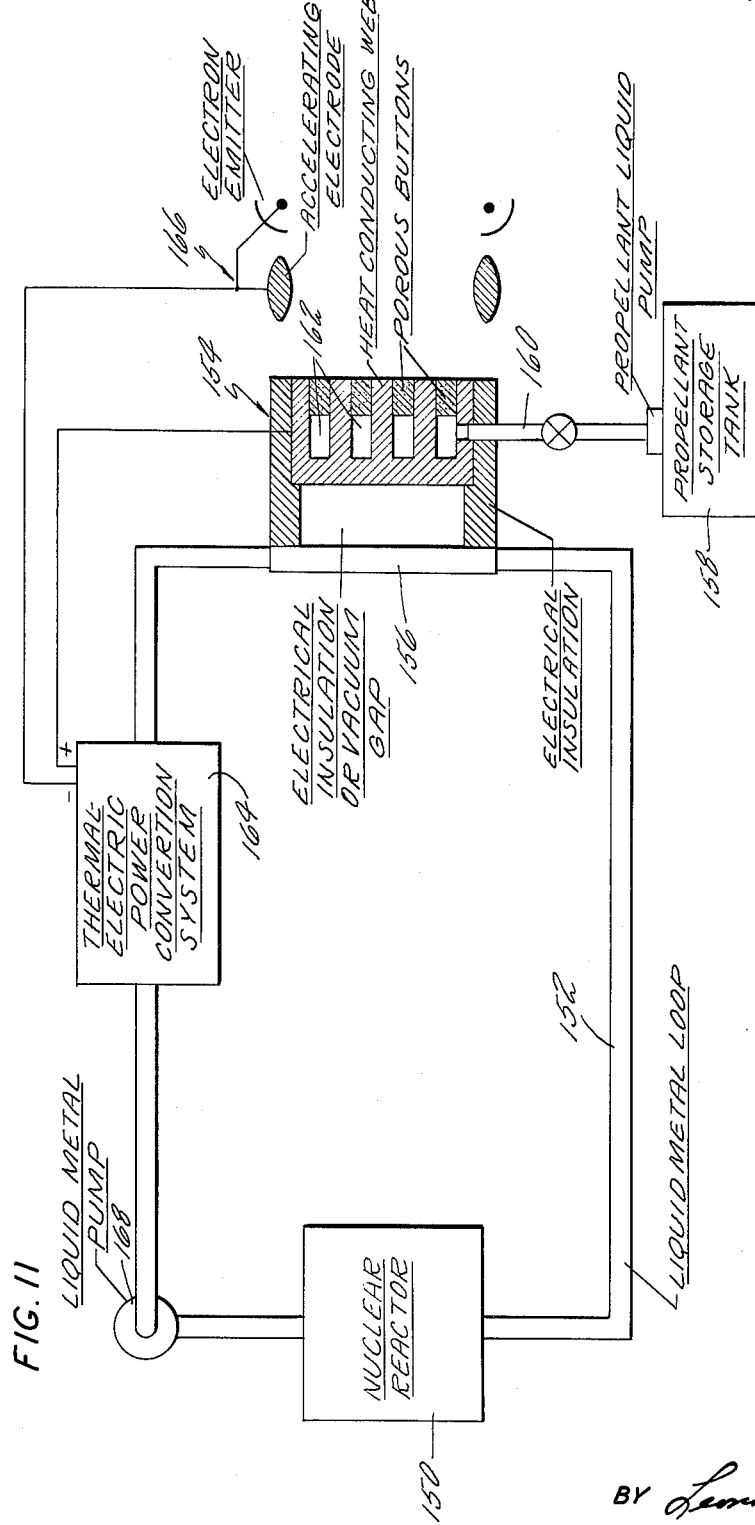
FIG. 11 is a schematic illustration of a simplified ion propulsion system.

FIG. 11 shows a very basic simplified arrangement utilizing the concept of this invention. As shown herein, a nuclear reactor is shown at 150 and has connected thereto a liquid metal loop 152. The ionizer means generally indicated at 154 receives heat from the loop in the flow region 156. A propellant source 158 feeds propellant to the line 160 to the passages 162 of the ionizer 154. The heat from the region 156 may be transferred by conduction or radiation to the ionizer to ionize the propellant. A thermoelectric power converter 164 provides electrical power for the accelerator 166. The pump 168 provides for continuous flow in the liquid metal loop.

As a result of this invention, it is clear that direct heating of ionizer surfaces can be provided thereby considerably reducing the weight of low specific impulse cesium ion engines. The heat-flux rates required are easily attainable with a liquid metal system and the necessary pump and power requirements are low. Furthermore, the additional weight due to the heat transfer equipment required is considerably less than the weight saving in the primary electric power supply which is normally used in electrically heated ionization systems.

Although several embodiments of this invention have been illustrated and described herein, it will be apparent that various changes and modifications may be made in the construction and arrangement of the various parts without departing from the scope of this novel concept.

We claim:

1. An ion propulsion system including a heat source, a fluid loop conducting heat from said source, ionizer means in said loop, a thermoelectric power converter connected in parallel in said loop, said ionizer means receiving heat from said fluid, a propellant supply connected to said ionizer means whereby the heat therein ionizes said propellant, and an accelerator receiving electrical power from said converter for accelerating the ionized propellant.

2. An ion propulsion system including a nuclear heat source, ionizer means, a source of propellant, means for pumping propellant from said source into said ionizer means, a first liquid metal loop receiving said heat from said nuclear source, a second liquid metal loop in heat exchange relation with said first loop, means providing a heat exchange relation with the liquid metal in said second loop and the propellant in said ionizer means, an electrical conversion device in said second loop and connected in parallel with said ionizer means, means electrically connected to said device for accelerating the ions produced by said ionizer means and a preheater in said second loop downstream of said ionizing means in heat exchange relation with the propellant flowing from said propellant source to said ionizing means.

3. An ion propulsion system as in claim 1 and including means for electrically isolating said ionizer means from said fluid.

4. An ion propulsion system as in claim 3 and including means for transferring heat from said fluid to said ionizer means by conduction through said electrically isolating means.

5. An ion propulsion system as in claim 3 and including means for transferring heat from said fluid to said ionizer means by radiation.

6. An ion propulsion system as in claim 2 in which said ionizer means is electrically isolated from the said liquid metal loops.

References Cited by the Examiner

UNITED STATES PATENTS 3,014,154 12/1961 Ehlers et al. _____ 60—35.5
3,099,131 7/1963 Rosa _____ 60—35.5

FOREIGN PATENTS 841,613 6/1952 Germany.

OTHER REFERENCES

"Advanced Propulsion Techniques," by Penner, Pergamon Press, New York, 1961. Pages 43, 57–58, 66–68, 213 and 223–226 relied on.

Engineering, Feb. 28, 1958. Pages 269 and 270 relied on.

Flight, March 20, 1959. Pages 385–387 relied on.

MARK NEWMAN, *Primary Examiner.*

ABRAM BLUM, *Examiner.*

SAMUEL LEVINE, BENJAMIN A. BORCHELT, C. R. CROYLE, *Assistant Examiners.*